United States Patent
Imanaka et al.

(10) Patent No.: US 11,635,144 B2
(45) Date of Patent: Apr. 25, 2023

(54) MULTI-LAYERED METAL SHEET

(71) Applicant: NICHIAS CORPORATION, Tokyo (JP)

(72) Inventors: Hironobu Imanaka, Tokyo (JP); Takeshi Murata, Tokyo (JP); Shinya Wasada, Tokyo (JP); Futoshi Tanaka, Kitakatsuragi-gun (JP)

(73) Assignee: NICHIAS CORPORATION, Tokyo (JP)

( * ) Notice: Subject to any disclaimer, the term of this patent is extended or adjusted under 35 U.S.C. 154(b) by 167 days.

(21) Appl. No.: 16/971,072

(22) PCT Filed: Feb. 5, 2019

(86) PCT No.: PCT/JP2019/004031
§ 371 (c)(1),
(2) Date: Aug. 19, 2020

(87) PCT Pub. No.: WO2019/163510
PCT Pub. Date: Aug. 29, 2019

(65) Prior Publication Data
US 2021/0010596 A1   Jan. 14, 2021

(30) Foreign Application Priority Data
Feb. 21, 2018  (JP) .............................. JP2018-028472

(51) Int. Cl.
*F16J 15/08* (2006.01)
*F02F 11/00* (2006.01)
*B32B 15/01* (2006.01)

(52) U.S. Cl.
CPC ......... *F16J 15/0825* (2013.01); *F02F 11/002* (2013.01); *B32B 15/01* (2013.01); *F16J 2015/0837* (2013.01)

(58) Field of Classification Search
CPC ................ F16J 15/0818; F16J 15/0825; F16J 2015/0837; F02F 11/002; B32B 15/01
See application file for complete search history.

(56) References Cited

U.S. PATENT DOCUMENTS

| | | | |
|---|---|---|---|
| 9,327,336 B2* | 5/2016 | Murakami | ........... B21D 39/031 |
| 2009/0166986 A1 | 7/2009 | Yasuda | |
| 2009/0311551 A1* | 12/2009 | Ueta | .................... F16J 15/0825 |
| | | | 428/603 |

FOREIGN PATENT DOCUMENTS

| CN | 101469646 A | 7/2009 |
|---|---|---|
| JP | 6-281011 A | 10/1994 |

(Continued)

OTHER PUBLICATIONS

Office Action dated Nov. 24, 2021, issued in counterpart CN Application No. 201980014884.7, with English Translation. (11 pages).

(Continued)

*Primary Examiner* — Eugene G Byrd
*Assistant Examiner* — L. Susmitha Koneru
(74) *Attorney, Agent, or Firm* — WHDA, LLP

(57) ABSTRACT

A multi-layered metal sheet is disclosed formed of a laminate of a plurality of metal sheets fixed to each other by a clinch formed in a concave shape from one main surface toward another main surface, the clinch has an schematic pillar shape, the clinch being defined by an open top, a pair of cut surfaces which are respectively formed from the open top toward a bottom, a pair of inclined surfaces respectively inclined from the open top toward the bottom, transitional surfaces which connect the cut surfaces and the inclined surfaces to each other, and the bottom having overlapping parts which extend over the main surface of the multi-layered metal sheet on a lower side immediately below the cut surfaces, and lengthwise end portions of a cut formed in (Continued)

each of upper edge portions of the cut surfaces are disposed on upper edge portions of the transitional surfaces.

10 Claims, 6 Drawing Sheets

(56) References Cited

FOREIGN PATENT DOCUMENTS

| | | |
|---|---|---|
| JP | 8-42696 A | 2/1996 |
| JP | 2006-38105 A | 2/2006 |
| JP | 2016-180501 A | 10/2016 |
| KR | 20090080764 A | 7/2009 |

OTHER PUBLICATIONS

International Search Report dated May 7, 2019, issued in counterpart application No. PCT/JP2019/004031, w/English translation (3 pages).
Written Opinion dated May 7, 2019, issued in counterpart application No. PCT/JP2019/004031 (4 pages).
Extend Supplementary European Search Report dated Oct. 18, 2021, issued in counterpart EP application No. 19757340.5. (7 pages).

\* cited by examiner

[Fig.1]
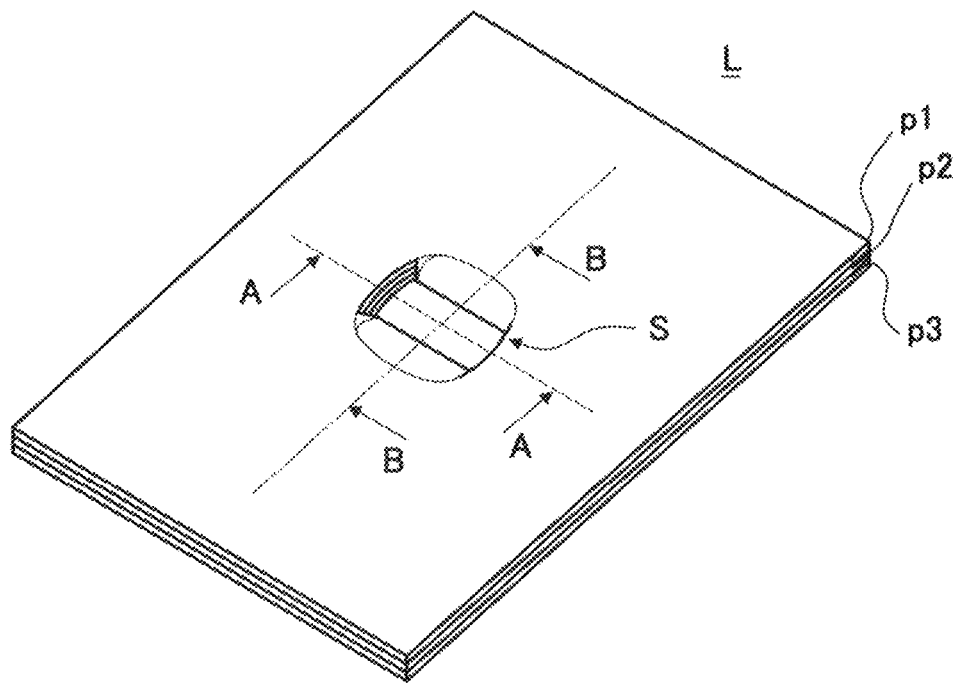
[Fig.2]
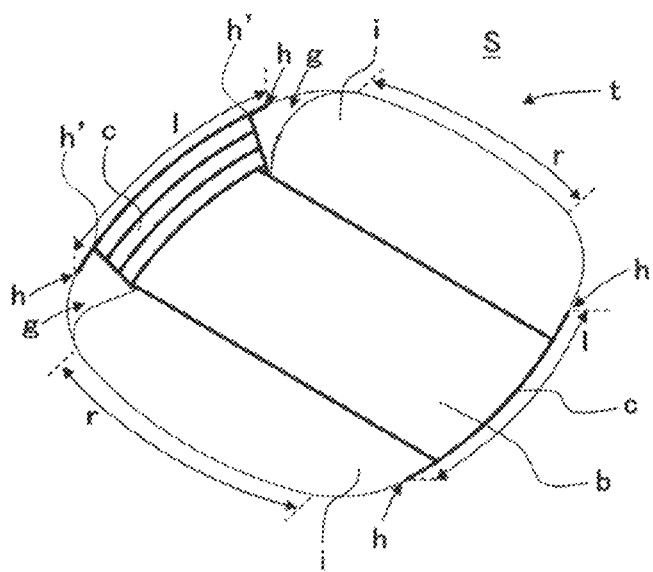

[Fig.3]
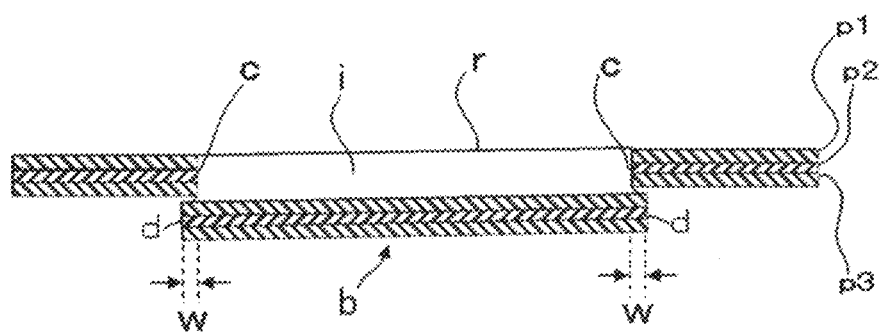
[Fig.4]
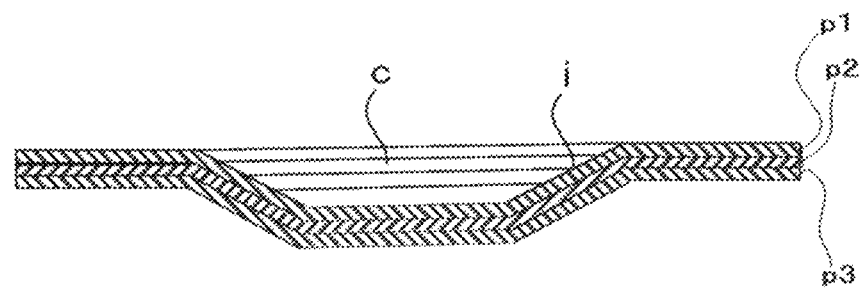

[Fig.5]
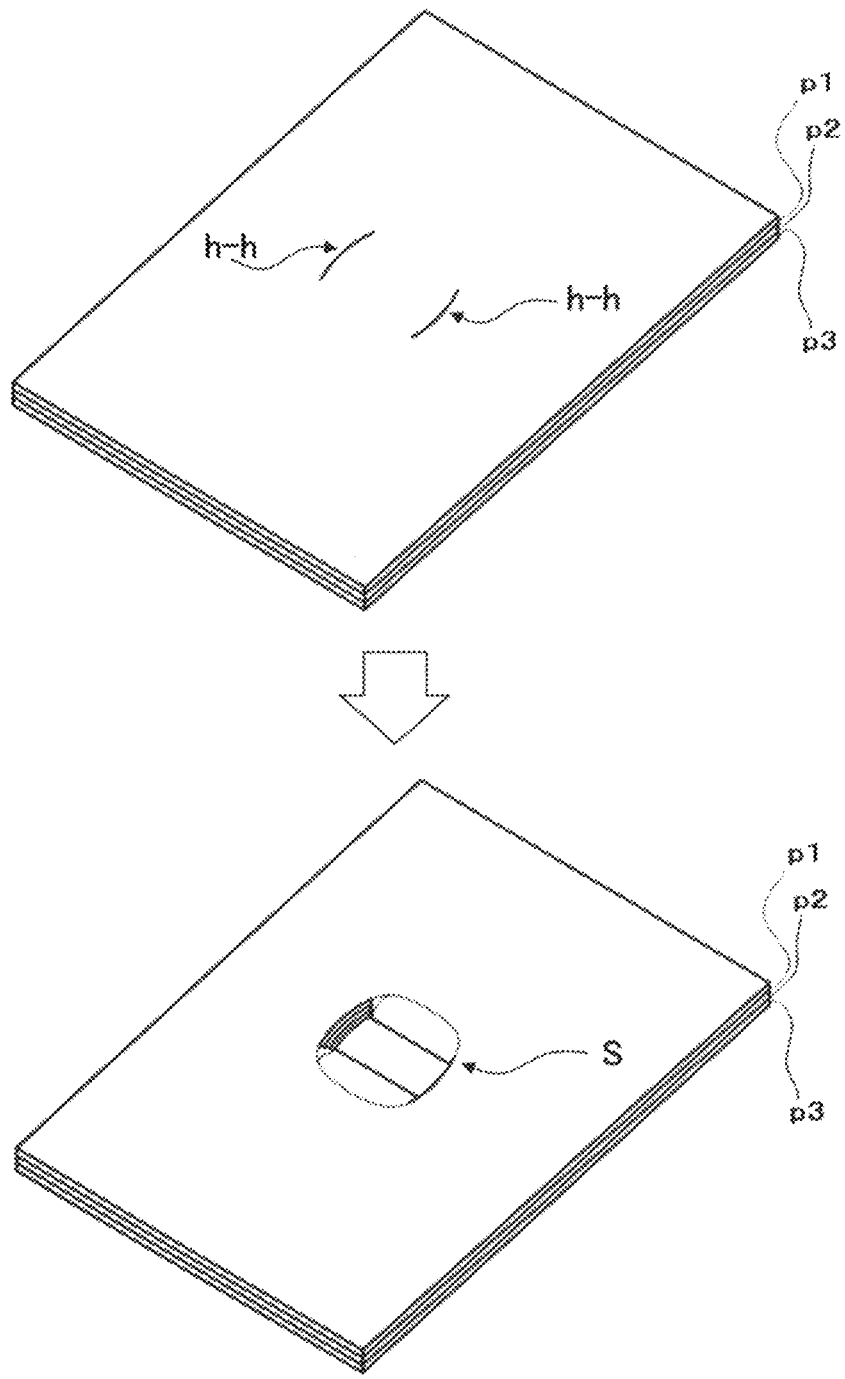

Fig. 6
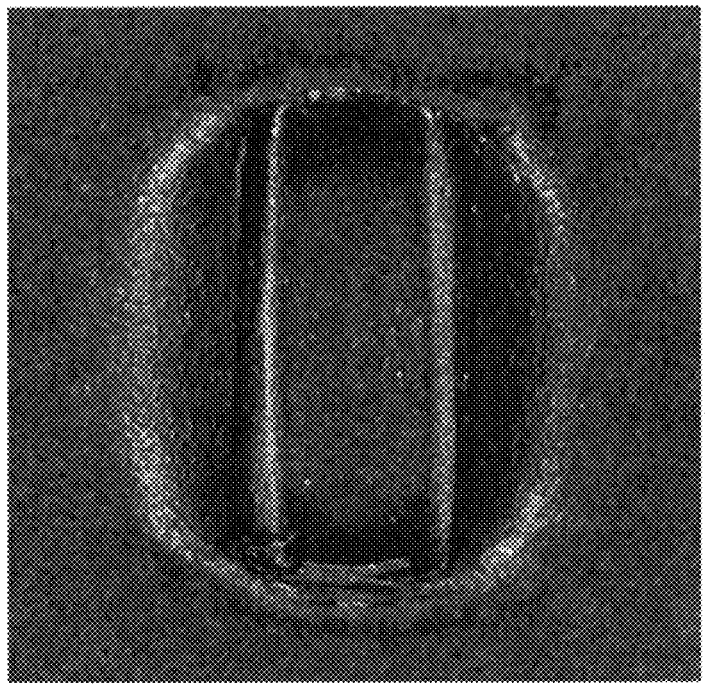
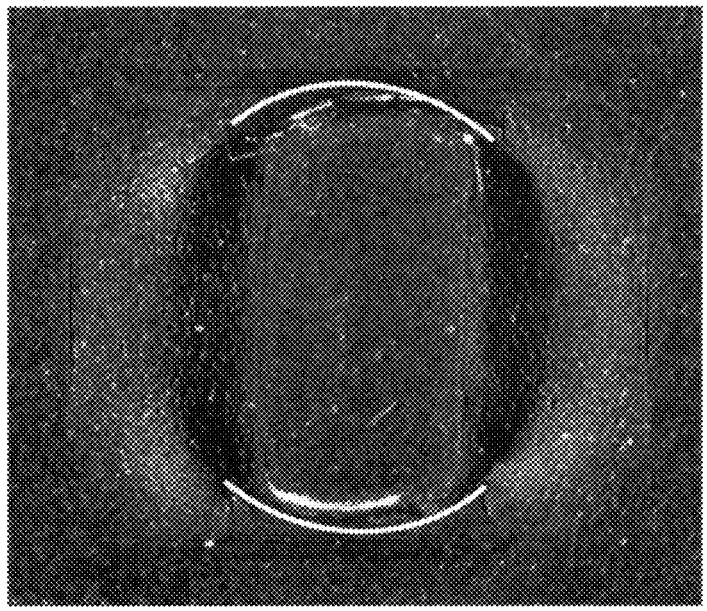

[Fig.7]
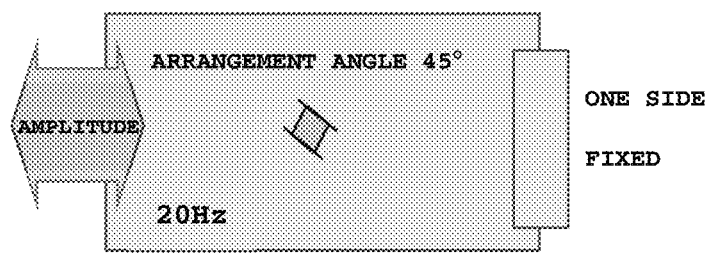
[Fig.8]
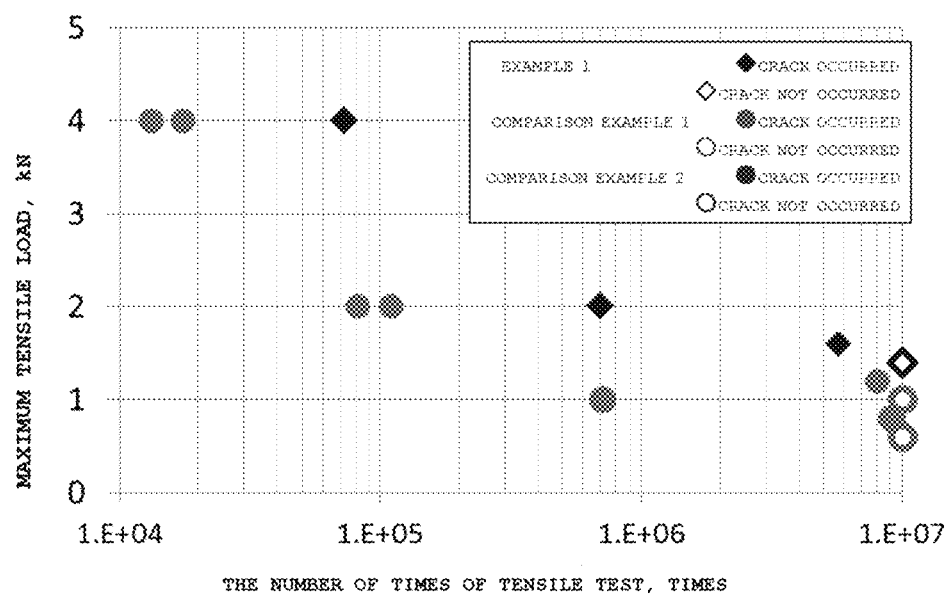

[Fig.9]
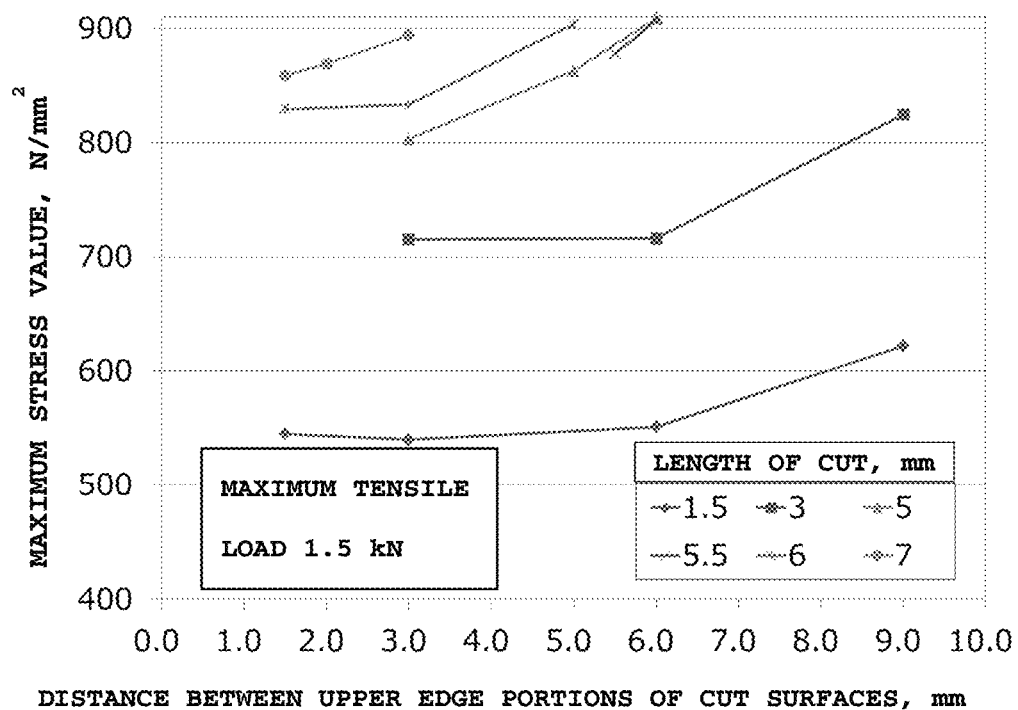

MULTI-LAYERED METAL SHEET

TECHNICAL FIELD

The present invention relates to a multi-layered metal sheet.

BACKGROUND ART

In general, a cylinder head gasket is interposed between a cylinder block and a cylinder head which form a combustion chamber of an engine. The cylinder head gasket provides sealing such that a combustion gas of high temperature and high pressure which is generated due to combustive explosion of fuel in the combustion chamber is prevented from leaking to the outside.

As the above-mentioned cylinder head gasket, to enhance sealing property and to enhance heat resistance and durability of the cylinder head gasket, a multi-layered metal sheet formed by laminating a plurality of thin steel sheets has been popularly used (see Patent Literature 1 (Japanese Patent Laid-Open No. 2016-180501), for example).

Recently, as the cylinder head gasket formed of such a multi-layered metal sheet, a cylinder head gasket has been studied where a concave or a convex such as a cut clinch or an embossed clinch is formed on a plurality of steel sheets (gasket sheets) which overlap with each other in a state where relative positions of the plurality of steel sheets are aligned with each other, and the plurality of steel sheets are fixed to each other so as not to be displaced from each other due to such a clinch and hence, the plurality of steel sheets are integrally formed with each other.

CITATION LIST

Patent Literature

[Patent Literature 1]
Japanese Patent Laid-Open No. 2016-180501

DISCLOSURE OF THE INVENTION

Technical Problem

However, according to a result of studies conducted by inventors of the present invention, it has been found that, with respect to a cylinder head gasket assembled between a cylinder block and a cylinder head, due to deformation of the cylinder block caused by a high pressure combustion gas in a combustion chamber, an external force (stress) such as a tensile force acts on the clinch thus damaging the gasket.

Particularly, it has been found that, when the clinch is formed by cuts, a crack occurs in a cut portion due to a stress generated in the cut portion thus giving rise to a drawback that durability of the cylinder head gasket is lowered.

To prevent lowering of the above-mentioned durability of the cylinder head gasket, several methods have been proposed including a method of increasing the number of clinchs formed on the cylinder head gasket. Recently, however, along with a demand for downsizing an engine, there is a tendency that a cylinder head gasket is also desired to be downsized. Accordingly, in a case where the above-mentioned clinchs are formed in plural for fixing the multi-layered metal sheet, a region where the clinchs can be formed is being restricted. Further, from a viewpoint of simplifying steps of manufacturing a cylinder head gasket and the reduction of cost of manufacturing the cylinder head gasket, clinchs formed on a cylinder head gasket are requested to satisfy a demand that a size (clinch forming area) is small and the number of clinchs formed on the cylinder head gasket is small as much as possible.

The present invention has been made under such circumstances, and it is an object of the present invention to provide a multi-layered metal sheet having high durability where the relative positions between a plurality of metal sheets are strongly fixed even when a clinch forming size (clinch forming area) is small.

Solution to Problem

To achieve the above-mentioned object, the inventors of the present invention have made extensive studies and, as a result of the studies, the inventors have found that the above-mentioned drawbacks can be overcome by a multi-layered metal sheet formed of a laminate of a plurality of metal sheets, wherein the plurality of metal sheets are fixed to each other by a clinch formed in a concave shape on the multi-layered metal sheet from one main surface toward the other main surface of the multi-layered metal sheet, the clinch formed in the concave shape has an schematic pillar shape, the clinch being defined by an open top, a pair of cut surfaces which are respectively formed from the open top toward a bottom and face each other, a pair of inclined surfaces which are respectively inclined from the open top toward the bottom and face each other, transitional surfaces which connect the cut surfaces and the inclined surfaces to each other, and the bottom having overlapping parts which extend over the main surface of the multi-layered metal sheet on a lower side immediately below the cut surfaces, and lengthwise end portions of a cut formed in each of upper edge portions of the cut surfaces are disposed on upper edge portions of the transitional surfaces. The inventors have completed the present invention based on such findings.

That is, the present invention provides:
(1) A multi-layered metal sheet formed of a laminate of a plurality of metal sheets, wherein
the plurality of metal sheets are fixed to each other by a clinch formed in a concave shape on the multi-layered metal sheet from one main surface toward the other main surface of the multi-layered metal sheet,
the clinch formed in the concave shape has an schematic pillar shape, the clinch being defined by an open top, a pair of cut surfaces which are respectively formed from the open top toward a bottom and face each other, a pair of inclined surfaces which are respectively inclined from the open top toward the bottom and face each other, transitional surfaces which connect the cut surfaces and the inclined surfaces to each other, and the bottom having overlapping parts which extend over the main surface of the multi-layered metal sheet on a lower side immediately below the cut surfaces, and lengthwise end portions of a cut formed in each of upper edge portions of the cut surfaces are disposed on upper edge portions of the transitional surfaces.
(2) In the multi-layered metal sheet described in the above (1), each of the cut surfaces is formed in a curved shape.
(3) In the multi-layered metal sheet described in the above (1) or (2), a length of the cut formed in each of the upper edge portions of the cut surfaces is 1.5 to 6.0 mm.
(4) In the multi-layered metal sheet described in any one of the above (1) to (3), with respect to the pair of cut surfaces, a distance between the upper edge portions of the cut surfaces is 1.5 to 10.0 mm.
(5) In the multi-layered metal sheet described in any one of the above (1) to (4), at the bottom of the clinch, an extending width of each of the overlapping parts extending over the main surface of the multi-layered metal sheet on a lower side immediately below each of the cut surfaces is 0.1 to 0.5 mm.

(6) In the multi-layered metal sheet described in any one of the above (1) to (5), the metal laminate is a cylinder head gasket.

Advantageous Effects of Invention

According to the present invention, it is possible to provide a multi-layered metal sheet having high durability where the relative positions between a plurality of metal sheets are strongly fixed even when a clinch forming size is small.

BRIEF DESCRIPTION OF DRAWINGS

FIG. 1 is a perspective view of a multi-layered metal sheet L which shows one example of a multi-layered metal sheet according to the present invention, wherein a plurality of metal sheets p1, p2, and p3 are fixed to each other by a clinch S.

FIG. 2 is an enlarged view of the clinch S in FIG. 1.

FIG. 3 is a cross-sectional view taken along a line A-A in FIG. 1.

FIG. 4 is a cross-sectional view taken along a line B-B in FIG. 1.

FIG. 5 is a view showing an example of forming a clinch which is formed on the multi-layered metal sheet according to the present invention.

FIG. 6 shows enlarged photographs of a clinch formed on a multi-layered metal sheet obtained by an example of the present invention. FIG. 6(*a*) is an enlarged photograph when the clinch was observed from an upper surface, and FIG. 6(*b*) is an enlarged photograph when the clinch was observed from a lower surface.

FIG. 7 is a view for describing the content of a tensile test performed with respect to examples of the present invention and comparison examples.

FIG. 8 is a view showing a result of the tensile test performed in the examples of the present invention and comparison examples.

FIG. 9 is a view showing a result of the tensile test performed in the examples of the present invention.

DESCRIPTION OF EMBODIMENTS

A multi-layered metal sheet according to the present invention is a multi-layered metal sheet formed of a laminate of a plurality of metal sheets, wherein the plurality of metal sheets are fixed to each other by a clinch formed in a concave shape on the multi-layered metal sheet from one main surface toward the other main surface of the multi-layered metal sheet, the clinch formed in the concave shape has an schematic pillar shape, the clinch being defined by an open top, a pair of cut surfaces which are respectively formed from the open top toward a bottom and face each other, a pair of inclined surfaces which are respectively inclined from the open top toward the bottom and face each other, transitional surfaces which connect the cut surfaces and the inclined surfaces to each other, and the bottom having overlapping parts which extend over the main surface of the multi-layered metal sheet on a lower side immediately below the cut surfaces, and lengthwise end portions of a cut formed in each of upper edge portions of the cut surfaces are disposed on upper edge portions of the transitional surfaces.

Hereinafter, the detail of the multi-layered metal sheet according to the present invention is described suitably with reference to drawings.

FIG. 1 is a perspective view showing one example of the multi-layered metal sheet according to the present invention, wherein a plurality of metal sheets p1, p2, and p3 are fixed to each other by a clinch S. FIG. 2 is an enlarged view of the clinch S in FIG. 1, FIG. 3 is a cross-sectional view taken along a line A-A in FIG. 1 and FIG. 4 is a cross-sectional view taken along a line B-B in FIG. 1.

In the multi-layered metal sheet according to the present invention, as the metal sheets, sheets which are made of metals selected from iron (Fe), copper (Cu), brass, platinum (Pt), aluminum (Al) and the like, and sheets which are made of alloy steel such as stainless steel can be named specifically.

In the multi-layered metal sheet according to the present invention, the plurality of respective metal sheets may be made of the same metal or may be made of different metals.

In the multi-layered metal sheet according to the present invention, the lamination number of metal sheets is preferably 2 to 5. When the multi-layered metal sheet according to the present invention is a cylinder head gasket, the lamination number of metal sheets is preferably 2 to 3.

In the multi-layered metal sheet according to the present invention, a sheet thickness of the metal sheet is not particularly limited. However, the sheet thickness of the metal sheet is preferably 0.06 to 0.3 mm, more preferably 0.08 to 0.25 mm, and still more preferably 0.1 to 0.2 mm.

A thickness of the multi-layered metal sheet according to the present invention (a distance from one main surface to the other main surface of a laminate of the metal sheets) is not particularly limited. However, the thickness of the multi-layered metal sheet is preferably 0.2 to 0.8 mm, more preferably 0.25 to 0.6 mm, and still more preferably 0.3 to 0.4 mm.

As exemplified in FIG. 1 to FIG. 4, the multi-layered metal sheet L according to the present invention is formed by fixing the plurality of (three in the example shown in FIG. 1 to FIG. 4) the metal sheets p1 to p3 by the clinch S formed in a concave shape from one main surface toward the other main surface of the multi-layered metal sheet.

The number of clinchs formed on the multi-layered metal sheet may be one. However, the number of clinchs may be plural. By setting the number of clinchs to a plural number, even when an external force such as a tensile force is generated in each metal sheet which forms the multi-layered metal sheet in a horizontal direction orthogonal to a sheet thickness direction, the lateral displacement such as rotation between the metal sheets can be preferably suppressed.

As shown in FIG. 2 which is an enlarged view, in the multi-layered metal sheet according to the present invention, the clinch S formed in a concave shape has an schematic pillar shape, and is defined by an open top t, a pair of cut surfaces c, c which are respectively formed from the open top t toward a bottom b and face each other, a pair of inclined surfaces i, i which are respectively inclined from the open top t toward the bottom b and face each other, transitional surfaces g which connect the respective cut surfaces c and the respective inclined surfaces i, and the bottom b.

As shown in FIG. 3 (a cross-sectional view taken along the line A-A in FIG. 1), in the metal sheet according to the present invention, the bottom b of the clinch S formed in a concave shape has overlapping parts d, d which extend over the main surface of the multi-layered metal sheet on a lower side immediately below the cut surfaces c, c.

In the multi-layered metal sheet according to the present invention, due to the formation of the clinch S formed in a concave shape, the movement of the respective metal sheets in the sheet thickness direction is fixed and hence, the displacement of the respective metal sheets in the horizontal direction orthogonal to the sheet thickness direction (the lateral displacement on the horizontal surfaces of the metal sheets) can be suppressed whereby, when the multi-layered metal sheet according to the present invention is used as a cylinder head gasket or the like, the multi-layered metal sheet can be easily mounted.

In the multi-layered metal sheet according to the present invention, lengthwise end portions of a cut formed in an upper edge portion of the cut surface which forms the clinch are disposed on upper edge portions of the transitional surfaces.

That is, as exemplified in FIG. 2, the lengthwise end portions h, h of the cut formed in the upper edge portion of the cut surface c are disposed on the upper edge portions of the transitional surfaces g.

In the multi-layered metal sheet according to the present invention, out of lengthwise end portions of the cut formed in the upper edge portion of the cut surface, at least one lengthwise end portion is disposed on the upper edge portion of the transitional surface g, and it is preferable that both lengthwise end portions of the cut be disposed on the upper edge portions of the transitional surfaces g.

In the multi-layered metal sheet according to the present invention, the cut surfaces are formed of two surfaces which face each other. In this case, it is particularly preferable that respective lengthwise end portions of the cuts formed in the upper edge portions of two cut surfaces be disposed on the upper edge portions of the transitional surfaces g.

In the documents of the present invention, the configuration that respective lengthwise end portions of the cuts are disposed on the upper edge portions of the transitional surfaces g means that the lengthwise end portions of the cut are disposed on ridges at upper edges of the transitional surfaces except for a boundary between the upper edge portion of the transitional surface g and a ridge which forms the upper edge portion of the cut surface and a boundary between the upper edge portion of the transitional surface g and a ridge which forms the upper edge portion of the inclined surface.

In the example shown in FIG. 2, the configuration that respective lengthwise end portions h of the cuts are disposed on the upper edge portions of the transitional surfaces g means that the lengthwise end portions h of the cut are disposed on the ridges at the upper edges of the transitional surfaces g except for the boundary between the upper edge portion of the transitional surface g and the ridge which forms the upper edge portion of the cut surface c and the boundary between the upper edge portion of the transitional surface g and the ridge which forms the upper edge portion of the inclined surface i.

Conventionally, with respect to a cut clinch, usually, lengthwise end portions of a cut formed in an upper edge portion of a cut surface are disposed at end portions of the upper edge portion of the cut surface (end portions h' exemplified in FIG. 2).

However, as a result of studies made by the inventors of the present invention, it has been found that, when the lengthwise end portions of the cut formed in the upper edge portion of the cut surface are disposed at the end portions of the upper edge portion of the cut surface (h' shown in FIG. 2) as described above, during the use of the multi-layered metal sheet, an external force (stress) such as a tensile force is liable to act in a concentrated manner on the lengthwise end portions on the upper edge portion of the cut surface and hence, a crack occurs and durability of the multi-layered metal sheet is easily lowered.

It has been also found that, even in the case where the lengthwise end portions of the cut formed in the upper edge portion of the cut surface are disposed on the upper edge portions of the inclined surfaces (the inclined surfaces i shown in FIG. 2), during the use of the multi-layered metal sheet, an external force (stress) such as a tensile force is liable to act in a concentrated manner on the lengthwise end portions on the upper edge portion of the cut surface and hence, a crack occurs and durability of the multi-layered metal sheet is easily lowered.

The inventors of the present invention have made further extensive studies based on the above-mentioned findings, and have found that, by disposing the lengthwise end portions of the cut formed in the upper edge portion of the cut surface on the upper edge portions of the transitional surfaces which respectively connect the cut surfaces and the inclined surfaces to each other, an external force (stress) such as a tensile stress is dispersed so that the occurrence of a crack can be effectively suppressed. The present invention has been completed based on such findings.

In the multi-layered metal sheet according to the present invention, the lengthwise end portions of the cut formed in the upper edge portion of the cut surface are disposed on the upper edge portions of the transitional surfaces and hence, the multi-layered metal sheet can easily exhibit high durability while strongly fixing the relative positions between the plurality of metal sheets.

That is, in the multi-layered sheet according to the present invention, even when an external force (stress) acts on the multi-layered metal sheet, since the lengthwise end portions of the cut formed in the upper edge portion of the cut surface are disposed at positions spaced apart from the cut surface, that is, on the upper edge portions of the transitional surfaces, the concentration of a stress generated in the upper edge portion of the cut surface can be alleviated. Accordingly, even when the clinch forming size (clinch forming area) is small, the multi-layered metal sheet can easily exhibit high durability while strongly fixing the relative positions between the plurality of metal sheets.

In the multi-layered metal sheet according to the present invention, it is preferable that the cut surface of the clinch be formed in a curved shape.

That is, as exemplified in FIG. 2, in the multi-layered metal sheet according to the present invention, it is preferable that the cut surface c be formed in a round curved shape.

In the multi-layered metal sheet according to the present invention, the cut surface is formed in a curved shape and hence, a shape of the upper edge portion of the cut surface (forming the open top) is also formed in a circular arcuate shape and hence, an external force (stress) applied to the upper edge portion of the cut surface can be easily dispersed. Accordingly, the occurrence of a crack at the end portion of the upper edge portion of the cut surface can be more easily suppressed.

In the multi-layered metal sheet according to the present invention, the length of the cut formed in the upper edge portion of the cut surface is preferably 1.5 to 6.0 mm, more preferably 1.5 to 4.0 mm, and still more preferably 1.5 to 2.5 mm.

In the multi-layered metal sheet according to the present invention, the length of the cut formed in the upper edge portion of the cut surface means a total length from one lengthwise end portion h to the other lengthwise end portion h at the upper edge portion of the cut surface, and such a length of the cut corresponds to the length 1 in the mode exemplified in FIG. 2.

In the multi-layered metal sheet according to the present invention, the length of the cut formed in the upper edge portion of the cut surface falls within the above-mentioned range and hence, it is possible to easily provide the multi-layered metal sheet having the clinch which exhibits excellent position fixing property and durability while further reducing an external force (stress) applied to the multi-layered metal sheet.

In the multi-layered metal sheet according to the present invention, with respect to the above-mentioned pair of cut surfaces, a distance between the upper edge portions of the cut surfaces is preferably 1.5 to 10.0 mm, more preferably 1.5 to 6.0 mm, and still more preferably 1.5 to 4.0 mm.

In the multi-layered metal sheet according to the present invention, with respect to the above-mentioned pair of inclined surfaces, a distance between the upper edge portions of the inclined surfaces is preferably 1.5 to 5.0 mm, more preferably 1.5 to 4.0 mm, and still more preferably 1.5 to 3.0 mm.

In the multi-layered metal sheet according to the present invention, even when the distance between the upper edge portions of the cut surfaces and the distance between the upper edge portions of the inclined surfaces fall within the above-mentioned ranges, that is, even when the size of the clinch (clinch forming area) is reduced, it is possible to easily provide the multi-layered metal sheet having excellent position fixing property and durability.

In the multi-layered metal sheet according to the present invention, an extending width (overlapping amount) of the overlapping part which extends over the main surface of the multi-layered metal sheet on the lower side immediately below the cut surface is preferably 0.1 to 0.5 mm, more preferably 0.15 to 0.4 mm, and still more preferably 0.2 to 0.3 mm.

In the multi-layered metal sheet according to the present invention, the extending width (overlapping amount) of the overlapping part which extends over the main surface of the multi-layered metal sheet on a lower side immediately below the cut surface means a distance from a position immediately below the cut surface to an extending end portion of the bottom, and corresponds to a horizontal direction length w of the overlapping part d in the mode exemplified in FIG. 3.

In the multi-layered metal sheet according to the present invention, the extending width of the overlapping part which extends over the main surface of the multi-layered metal sheet on the lower side immediately below the cut surface falls within the above-mentioned range and hence, it is also possible to easily provide the multi-layered metal sheet having the clinch which exhibits excellent position fixing property and durability while further reducing an external force (stress) applied to the multi-layered metal sheet.

The multi-layered metal sheet according to the present invention can be easily manufactured by press clinching.

FIG. 5 is a view showing an example of forming the clinch which is formed on the multi-layered metal sheet according to the present invention.

As shown in an upper drawing in FIG. 5, in a metal laminate formed by laminating the plurality of metal sheets p1 to p3, cuts h-h are formed in the metal laminate such that the cuts h-h penetrate the metal laminate from one main surface to the other main surface and face each other, and a concave portion is formed by applying press forming treatment between such cuts h-h, and the bottom of the concave portion is stretched on a main surface of the metal sheet p3 on the lower side immediately below the cuts h-h so that extending portions (overlapping parts) are formed. As a result, the clinch S shown in a lower drawing in FIG. 5 can be formed.

The clinch S formed in this manner is also referred to as a lance lock.

The multi-layered metal sheet according to the present invention can be preferably used as a cylinder head gasket which forms an engine, for example.

According to the present invention, it is possible to provide a multi-layered metal sheet having high durability where the relative positions between a plurality of metal sheets are strongly fixed.

Next, the present invention is more specifically described in view of examples. However, these examples are provided for an exemplifying purpose, and the present invention is not limited by such examples.

Example 1

As shown in the upper drawing in FIG. 5, in a metal laminate obtained by laminating a metal sheet p1 made of a stainless steel sheet (SUS301, thickness: 0.2 mm), a metal sheet p2 made of a stainless steel sheet (SUS304, thickness: 0.06 mm) and a metal sheet p3 made of a stainless steel sheet (SUS301, thickness: 0.2 mm), the cuts h-h having a curved shape were formed in the metal laminate so as for the cuts h-h to penetrate the metal laminate from one main surface (a main surface of the metal sheet p1 on an outer side) to the other main surface (the main surface of the metal sheet p3 on an outer side) in a state of the cuts h-h facing each other and, thereafter, the concave portion was formed by applying press forming treatment between such cuts h-h.

As shown in FIG. 2 and FIG. 3, the above-mentioned press treatment was performed under a control such that the concave portion has an schematic pillar shape which is defined by the pair of cut surfaces c, c in which portions of the cuts h-h form the upper edge portions of the cut surfaces c, c and which face each other, the pair of inclined surfaces i, i which are respectively inclined from the open top toward the bottom and face each other, the transitional surfaces g which connect the respective cut surfaces and the inclined surfaces, and the bottom b which is stretched on the main surface of the metal sheet p3 on the lower side immediately below the cut surfaces (indicated by symbol d in FIG. 3) so as to have overlapping parts. The pressing treatment was performed under a control such that the lengthwise end portions h of the cut are positioned on the upper edge portions of the transitional surfaces g.

In such an operation, the clinch S was formed within a clinch forming region having a diameter of 5 mm. The length of the upper edge portion of the cut surface of the clinch (the length of each of cuts h-h) (indicated by symbol I in FIG. 2) was 2.4 mm, a distance between the upper edge portions of the cut surfaces (the longest distance with respect to the distance between the cut surfaces c, c facing each other) was 4.0 mm, and the length of the overlapping part (indicated by symbol w in FIG. 3) was 0.2 mm. FIG. 6 shows enlarged photographs of the clinch formed on the multi-layered metal sheet obtained by Example 1. FIG. 6(a) is an enlarged photograph when the clinch was observed from an upper surface of the multi-layered metal sheet, and FIG. 6(b) is an enlarged photograph when the clinch was observed from a lower surface of the multi-layered metal sheet. A blanked solid line shown in FIG. 6(b) indicates the upper edge portions of the cut surfaces (ranges in each of which the cut is formed).

Comparison Example 1

Except that respective cuts h1-h1 on a straight line (length of each of cuts h1-h1: 5.0 mm, a distance between cuts h1-h1: 3.0 mm) were formed in place of the cuts h-h having a curved shape in Example 1, a comparison clinch S1 having overlapping parts was formed by press forming in the same manner as Example 1.

The obtained comparison clinch S1 was located within the clinch forming region having a diameter of 5 mm, a length of an upper edge portion of a cut surface of the clinch (the length of each cut h1-h1) was 5.0 mm, a distance between the upper edge portions of the cut surfaces (the longest distance with respect to a distance between the cuts h1-h1 facing each other) was 3.0 mm, and a length of the overlapping part was 0.2 mm. Further, all lengthwise end portions on the upper edge portions of the cut surfaces (end portions of the cuts h1-h1) were positioned on upper edge portions of inclined surfaces (on ridges forming the upper edge portions of the inclined surfaces).

Comparison Example 2

Except that respective cuts h2-h2 on a straight line (length of each of cuts h2-h2: 7.0 mm, distance between cuts h2-h2 facing each other (the longest distance with respect to the distance between the cuts h2-h2 facing each other): 2.0 mm) were formed in place of the cuts h-h having a curved shape, and the clinch was formed within a clinch forming region having a diameter of 7 mm in Example 1, a comparison clinch S2 having overlapping parts was formed by press forming in the same manner as Example 1.

The obtained comparison clinch S2 was located within the clinch forming region having a diameter of 7 mm, a length of an upper edge portion of a cut surface of the clinch (the length of each cut h2-h2) was 7.0 mm, a distance between the upper edge portions of the cut surfaces (the longest distance with respect to a distance between the cuts h2-h2) was 2.0 mm, and a length of the overlapping part was 0.2 mm. Further, all lengthwise end portions on the upper edge portions of the cut surfaces (end portions of the cuts h2-h2) were positioned on upper edge portions of inclined surfaces (on ridges forming the upper edge portions of the inclined surfaces).

Tensile Test

In Example 1, Comparison Example 1 and Comparison Example 2, as shown in FIG. 7, a plurality of specimens (longitudinal size: 80 mm, lateral size: 30 mm) were prepared such that a clinch was positioned at an inclination angle of 45° with respect to a longitudinal direction of a multi-layered metal sheet. In a state where one side of each specimen was fixed, a tensile test was repeatedly performed until occurrence of a crack under a condition where a lower limit load was 0 kN, a maximum load was 1 kN to 4 kN, an amplitude width was 60 μm, and a frequency was 20 Hz.

The result of the tensile test is shown in FIG. 8. In the multi-layered metal sheet obtained by Example 1, when stresses at measurement positions respectively 0.3 mm outside from both lengthwise end portions on the upper edge portion of the cut surface (cut h-h) were analyzed, it was confirmed that the specimen is broken when the maximum stress analysis value is 910 N/mm$^2$.

Example 2

Except that the length of each cut h-h having a curved shape was set to 1.5 mm and a distance between the upper edge portions of the cut surfaces facing each other (the longest distance with respect to the distance between two cuts h-h facing each other) was set to 1.5 mm, 3.0 mm, 6.0 mm, and 9.0 mm respectively in Example 1, respective multi-layered metal sheets where the length of the overlapping part was 0.2 mm were obtained in the same manner as Example 1.

Example 3

Except that the length of each cut h-h having a curved shape was set to 3.0 mm and a distance between the upper edge portions of the cut surfaces facing each other (the longest distance with respect to the distance between two cuts h-h facing each other) was set to 3.0 mm, 6.0 mm, and 9.0 mm respectively in Example 1, respective multi-layered metal sheets where the length of the overlapping part was 0.2 mm were obtained in the same manner as Example 1.

Example 4

Except that the length of each cut h-h having a curved shape was set to 5.0 mm and a distance between the upper edge portions of the cut surfaces facing each other (the longest distance with respect to the distance between two cuts h-h facing each other) was set to 3.0 mm, 5.0 mm, and 6.0 mm respectively in Example 1, respective multi-layered metal sheets where the length of the overlapping part was 0.2 mm were obtained in the same manner as Example 1.

Example 5

Except that the length of each cut h-h having a curved shape was set to 5.5 mm and a distance between the upper edge portions of the cut surfaces facing each other (the longest distance with respect to the distance between two cuts h-h facing each other) was set to 5.5 mm and 6.0 mm respectively in Example 1, respective multi-layered metal sheets where the length of the overlapping part was 0.2 mm were obtained in the same manner as Example 1.

Example 6

Except that the length of each cut h-h having a curved shape was set to 6.0 mm and a distance between the upper edge portions of the cut surfaces facing each other (the longest distance with respect to the distance between two cuts h-h facing each other) was set to 1.5 mm, 3.0 mm, and 5.0 mm respectively in Example 1, respective multi-layered metal sheets where the length of the overlapping part was 0.2 mm were obtained in the same manner as Example 1.

Example 7

Except that the length of each cut h-h having a curved shape was set to 7.0 mm and a distance between the upper edge portions of the cut surfaces facing each other (the longest distance with respect to the distance between two cuts h-h facing each other) was set to 1.5 mm, 2.0 mm, and 3.0 mm respectively in Example 1, respective multi-layered metal sheets where the length of the overlapping part was 0.2 mm were obtained in the same manner as Example 1.

Tensile Test

In Example 2 to Example 7, as shown in FIG. 7, respective specimens (longitudinal size: 80 mm, lateral size: 30 mm) were prepared such that a clinch was positioned at an inclination angle of 45° with respect to a longitudinal direction of a multi-layered metal sheet. As shown in FIG. 7, in a state where one side of each specimen was fixed, values of maximum stress occurring in the vicinity of both lengthwise end portions on the upper edge portion of the cut surface (measurement positions respectively 0.3 mm outside from both lengthwise end portions on the upper edge portion on the cut surface) when a load was increased while setting a maximum load to 1.5 kN were calculated by an analysis.

A result of the tensile test is shown in FIG. 9.

The following is understood from FIG. 8. When a maximum tensile load applied to the multi-layered metal sheet is substantially equal, the number of times that the tensile test is performed until a crack occurs in the multi-layered metal sheet having the particular clinch obtained in Example 1 is small compared to the number of times that the tensile test is performed until a crack occurs in the multi-layered metal sheet having the clinch obtained in Comparison Example 1 or Comparison Example 2.

Particularly, when a maximum tensile load applied to the multi-layered metal sheet is approximately 1.5 kN, a crack does not occur in the multi-layered metal sheet having the particular clinch obtained in Example 1 even when the number of times that the tensile test is performed reaches $1 \times 10^7$ times (ten million times). On the other hand, a tendency is observed that a crack occurs along with the increase of the number of times that the tensile test is performed in the multi-layered metal sheet having the clinch obtained in Comparison Example 1 or Comparison Example 2.

The following is also understood from FIG. 9. With respect to the multi-layered metal sheets having the particular clinch obtained in Example 2 to Example 7 where the length of the cuts h-h having a curved shape or the distance between the upper edge portions of the cut surfaces facing each other (the longest distance with respect to the distances between two cuts h-h facing each other) are changed respectively, also in the case where the length of the cut or the distance between the upper edge portions of the cut surfaces facing each other are substantially equal to the corresponding length and distance in Comparison Example 1 or Comparison Example 2, when a tensile test of a maximum tensile load of 1.5 kN is applied to the multi-layered metal sheets in Example 2 to Example 7, a generated stress does not exceed a maximum stress value of 910 N/mm² which causes the occurrence of a crack, so that the occurrence of the crack can be preferably suppressed.

In this manner, the following is understood from FIG. 8 and FIG. 9. In the multi-layered metal sheets obtained in Example 1 to Example 7, the lengthwise end portions of the cut formed in the upper edge portion of the cut surface which forms the clinch formed in a concave shape are disposed on the upper edge portions of the transitional surfaces and hence, the multi-layered metal sheets obtained in Example 1 to Example 7 can alleviate the concentration of a stress and can exhibit high durability while strongly fixing the relative positions between a plurality of metal sheets.

On the other hand, the following is understood from FIG. 8. In the multi-layered metal sheets according to Comparison Example 1 and Comparison Example 2, lengthwise end portions on the upper edge portions of the cut surface are positioned on the upper edge portions of the inclined surfaces (or the ridges forming the upper edge portions of the inclined surfaces) and hence, the multi-layered metal sheets according to Comparison Example 1 and Comparison Example 2 exhibit poor durability.

INDUSTRIAL APPLICABILITY

According to the present invention, it is possible to provide a multi-layered metal sheet having high durability where the relative positions between a plurality of metal sheets are strongly fixed even when a clinch forming size is small.

REFERENCE SIGNS LIST p1, p2, p3 metal sheet
S clinch
t open top
b bottom
c cut surface
i inclined surface
d overlapping part
r ridge
h lengthwise end portion on upper edge portion of cut surface

The invention claimed is:

1. A multi-layered metal sheet formed of a laminate of a plurality of metal sheets, wherein
    the plurality of metal sheets are fixed to each other by a clinch formed in a concave shape on the multi-layered metal sheet from one main surface toward another main surface of the multi-layered metal sheet,
    the clinch formed in the concave shape has a schematic pillar shape, the clinch being defined by an open top, a pair of cut surfaces which are respectively formed from the open top toward a bottom and face each other, a pair of inclined surfaces which are respectively inclined from the open top toward the bottom and face each other, transitional surfaces disposed between the cut surfaces and sides of the inclined surfaces, and the bottom having overlapping parts which extend over the main surface of the multi-layered metal sheet on a lower side immediately below the cut surfaces, and
    lengthwise end portions of a cut formed in each of upper edge portions of the cut surfaces are disposed on upper edge portions of the transitional surfaces except for a boundary of a ridge which forms the upper edge portion of the cut surface.

2. The multi-layered metal sheet according to claim 1, wherein each of the cut surfaces is formed in a curved shape.

3. The multi-layered metal sheet according to claim 1, wherein a length of the cut formed in each of the upper edge portions of the cut surfaces is 1.5 to 6.0 mm.

4. The multi-layered metal sheet according to claim 1, wherein, with respect to the pair of cut surfaces, a distance between the upper edge portions of the cut surfaces is 1.5 to 10.0 mm.

5. The multi-layered metal sheet according to claim 1, wherein, at the bottom of the clinch, an extending width of each of the overlapping parts extending over the main surface of the multi-layered metal sheet on a lower side immediately below each of the cut surfaces is 0.1 to 0.5 mm.

6. The multi-layered metal sheet according to claim 1, wherein the metal laminate is a cylinder head gasket.

7. The multi-layered metal sheet according to claim 2, wherein the metal laminate is a cylinder head gasket.

8. The multi-layered metal sheet according to claim 3, wherein the metal laminate is a cylinder head gasket.

9. The multi-layered metal sheet according to claim 4, wherein the metal laminate is a cylinder head gasket.

10. The multi-layered metal sheet according to claim 5, wherein the metal laminate is a cylinder head gasket.

* * * * *